(12) United States Patent
Thorsander et al.

(10) Patent No.: US 9,491,260 B2
(45) Date of Patent: Nov. 8, 2016

(54) METHOD AND APPARATUS PERTAINING TO THE SHARING OF CONTENT

(75) Inventors: Simon Martin Thorsander, Eslov (SE); Robert Simon Lessing, Malmo (SE); Per Ake Daniel Johansson, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 83 days.

(21) Appl. No.: 13/461,154

(22) Filed: May 1, 2012

(65) Prior Publication Data
US 2013/0298074 A1 Nov. 7, 2013

(51) Int. Cl.
| | |
|---|---|
| *G06F 3/048* | (2013.01) |
| *H04L 29/08* | (2006.01) |
| *G06F 3/0481* | (2013.01) |
| *G06F 9/44* | (2006.01) |
| *G06Q 10/10* | (2012.01) |

(52) U.S. Cl.
CPC .............. *H04L 67/36* (2013.01); *G06F 3/0481* (2013.01); *G06F 9/4443* (2013.01); *G06Q 10/109* (2013.01)

(58) Field of Classification Search
CPC ....................................... G06F 3/048–3/04897
USPC ......................... 715/781, 810, 811, 812, 813
See application file for complete search history.

(56) References Cited

U.S. PATENT DOCUMENTS

| | | | | |
|---|---|---|---|---|
| 2007/0035764 | A1* | 2/2007 | Aldrich ............... | G06F 17/3028 358/1.15 |
| 2007/0038567 | A1* | 2/2007 | Allaire et al. .................. | 705/50 |
| 2007/0101279 | A1* | 5/2007 | Chaudhri et al. ............. | 715/762 |
| 2007/0157107 | A1* | 7/2007 | Bishop .......................... | 715/771 |
| 2008/0266407 | A1* | 10/2008 | Battles et al. ............. | 348/211.2 |
| 2009/0187825 | A1 | 7/2009 | Sandquist et al. | |
| 2009/0190601 | A1* | 7/2009 | Kim et al. ..................... | 370/401 |
| 2009/0234876 | A1* | 9/2009 | Schigel et al. ................ | 707/102 |
| 2009/0292762 | A1 | 11/2009 | Mettala et al. | |

(Continued)

FOREIGN PATENT DOCUMENTS

WO 2012-021369 A2 2/2012

OTHER PUBLICATIONS

Extended European Search Report from related European Patent Application No. 12166310.8 dated Sep. 19, 2012; 6 pages.

(Continued)

*Primary Examiner* — Haoshian Shih
(74) *Attorney, Agent, or Firm* — Jose Gutman; Fleit Gibbons Gutman Bongini & Bianco, P.L.

(57) ABSTRACT

A control circuit co-displays a share-content selection opportunity (such as, but not limited to, a user-selectable icon button) when also displaying shareable content. Upon detecting selection of this share-content selection opportunity, the control circuit displays a plurality of different selectable content-sharing services. By one approach these different selectable content-sharing services are displayed in a window that partially, but not fully, overlies the shareable content. These teachings also provide for displaying a preselected service window for a given one of the plurality of different selectable content-sharing services. The preselected service can be selected, for example, on the basis of having been a most-recently selected one of the different selectable content-sharing services (either in general or in conjunction with the particular application as corresponds to the shareable content).

12 Claims, 10 Drawing Sheets

(56) References Cited

U.S. PATENT DOCUMENTS

| | | | |
|---|---|---|---|
| 2010/0268584 A1* | 10/2010 | Pullur et al. | 705/14.16 |
| 2011/0202879 A1* | 8/2011 | Stovicek et al. | 715/828 |
| 2011/0298732 A1* | 12/2011 | Yoshimoto et al. | 345/173 |
| 2012/0304108 A1* | 11/2012 | Jarrett | G06F 3/04883 715/781 |
| 2012/0330702 A1* | 12/2012 | Kowalski et al. | 705/7.11 |
| 2013/0031208 A1* | 1/2013 | Linton et al. | 709/217 |
| 2013/0090097 A1* | 4/2013 | Klassen | H04L 67/06 455/414.1 |
| 2013/0282755 A1* | 10/2013 | Procopio et al. | 707/770 |

OTHER PUBLICATIONS

Canadian Office Action from related Canadian Patent Application No. 2,813,955 dated May 26, 2014; 3 pages.
Canadian Office Action dated May 26, 2015, received for Canadian Application No. 2,813,955.

* cited by examiner

METHOD AND APPARATUS PERTAINING TO THE SHARING OF CONTENT

FIELD OF TECHNOLOGY

The present disclosure relates to electronic communication devices, including but not limited to portable electronic devices having two-way wireless communications capabilities.

BACKGROUND

Modern electronic devices, including many portable electronic devices, typically support a wide variety of applications. Examples of such applications and their wide diversity include word processing applications; image capture, editing, and presentation applications; video capture, editing, and presentation applications; appointment scheduling calendars; and contact information applications, to note but a few.

These same devices also typically support a variety of ways by which the user may elect to share their application-specific content (such as word-processing documents, pictures, videos, scheduling information, contact information, and so forth) with others. Examples include personal-forwarding services (i.e., services characterized by directly-addressed communications between one or several persons with typical protocols including email, short message service (SMS), multimedia messaging service (MMS) and so forth), publishing services (i.e., services characterized by a broadcast to a larger audience with typical protocols including Picasa™, Facebook™, Gowalla™, YouTube™, and so forth), and transfer services (i.e., services characterized by sharing content with another specifically-targeted physical entity, such as a specific portable electronic device, with typical protocols including Bluetooth™, universal plug and play as promulgated by the Digital Living Network Alliance, and so forth).

Unfortunately, this plethora of applications and sharing services gives rise to a considerable number of options when a user wishes to share a particular item of content. The user may forget, for example, the availability of one or more sharing options. Forgetting about the availability of a particular sharing option can be particularly vexing when the forgotten sharing option is in fact a sharing option that is a best suited (or at least most preferred) approach to sharing a particular type of content.

BRIEF DESCRIPTION OF THE DRAWINGS

FIGS. 4-1 to 4-4 are top plan views in accordance with the disclosure.

FIGS. 6-1 and 6-2 are top plan views in accordance with the disclosure.

DETAILED DESCRIPTION

Figure 1:
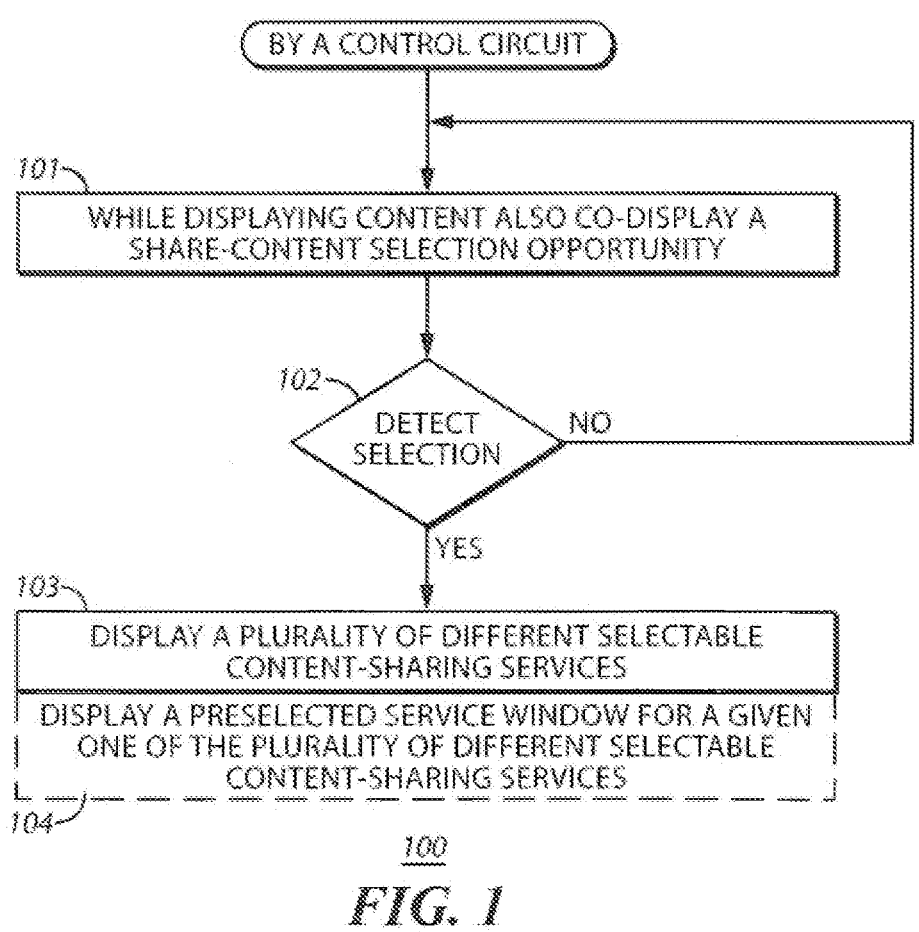
FIG. 1 is a flow diagram in accordance with the disclosure.

The following describes an apparatus and method pertaining to a control circuit that co-displays a share-content selection opportunity (such as, but not limited to, a user-selectable icon button) when also displaying shareable content. Upon detecting selection of this share-content selection opportunity, the control circuit displays a plurality of different selectable content-sharing services. By one approach these different selectable content-sharing services are displayed in a window that partially, but not fully, overlies the shareable content.

By one approach, these teachings also provide for displaying a preselected service window for a given one of the plurality of different selectable content-sharing services. The preselected service can be selected, for example, on the basis of having been a most-recently selected one of the different selectable content-sharing services (either in general or in conjunction with the particular application as corresponds to the shareable content). These teachings will also accommodate including branding content as corresponds to the preselected content-sharing service when displaying that preselected service window.

So configured, a user who wishes to share a given item of content can assert a single displayed button to gain access to a listing of all available selectable content-sharing services. Such an approach spares the user from having to mentally recollect and formulate such a listing. Such an approach also greatly aids in helping the user to avoid overlooking any particular choices in these regards.

By also displaying a preselected service window for a given one of the selectable content-sharing services, these teachings also provide the user with an intuitive suggestion regarding an appropriate (or even preferred) content-sharing service to utilize with respect to the given item of content. This suggestion can, in turn, be based upon any number of criteria including both objective and subjective valuations as desired.

These teachings are highly flexible in practice and will accommodate a wide variety of content types as well as different types of content-sharing services. The concepts disclosed herein are also readily scaled to include essentially any number of content-sharing services and any size of content file. These teachings are also readily employed in conjunction with many existing platform architectures and hence can readily serve to leverage the functionality and usability of those platforms.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
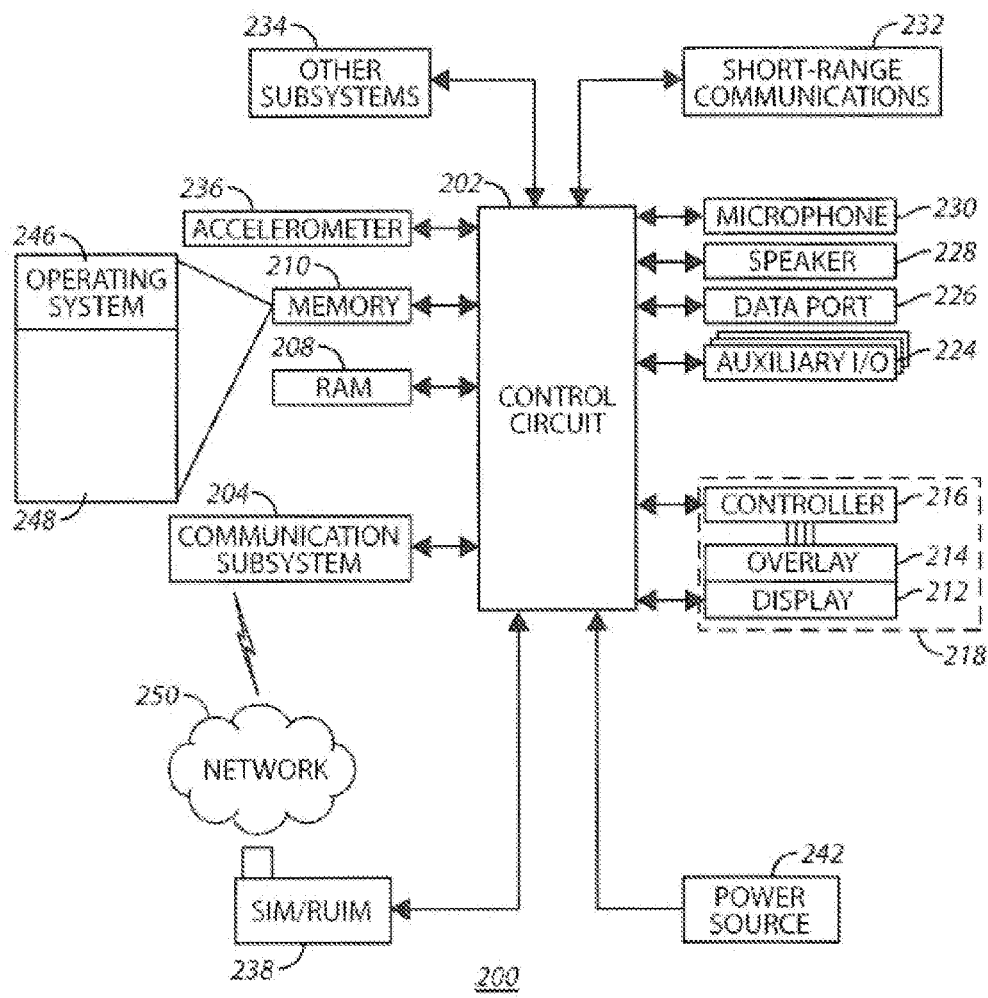
FIG. 2 is a block diagram in accordance with the disclosure.

FIG. 1 presents a process 100 that comports with many of these teachings. For the sake of an illustrative example the following description presumes that a control circuit of choice carries out this process 100. By way of further example, and without intending any particular limitations in these regards, as shown in FIG. 2 this control circuit 202 can be configured to control the overall operation of a corresponding portable electronic device 200 (such as, but not limited to, a so-called smartphone or tablet-based computer).

Communication functions, including data and voice communications, are performed through a communication subsystem 204. The communication subsystem receives messages from and sends messages to a wireless network 250. The wireless network 250 may be any type of wireless network, including, but not limited to, data wireless networks, voice wireless networks, and networks that support both voice and data communications. A power source 242, such as one or more rechargeable batteries or a port to an external power supply, powers the electronic device.

The control circuit 202 interacts with other elements, such as Random Access Memory (RAM) 208, memory 210, a display 212 with a touch-sensitive overlay 214 operably coupled to an electronic controller 216 that together comprise an optional touch-sensitive display 218, an auxiliary input/output (I/O) subsystem 224, a data port 226, a speaker 228, a microphone 230, a short-range communication subsystem 232, and other device subsystems 234 of choice.

One or more user interfaces are provided. Input via a graphical user interface is provided via the touch-sensitive overlay 214. The control circuit 202 interacts with the touch-sensitive overlay 214 via the electronic controller 216. Information, such as text, characters, symbols, images, icons, and other items that may be displayed or rendered on a portable electronic device, is displayed on the touch-sensitive display 218 via the control circuit 202.

In this illustrative example the control circuit 202 also interacts with an accelerometer 236 to detect, for example, a direction of gravitational forces or gravity-induced reaction forces. This information can serve, for example, to permit the control circuit 202 to automatically switch between portrait and landscape modes of displaying content on the touch-sensitive display 218.

To identify a subscriber for network access, the portable electronic device may utilize a Subscriber Identity Module or a Removable User Identity Module (SIM/RUIM) card 238 for communication with a network, such as the wireless network 250. Alternatively, user identification information may be programmed into the memory 210.

The portable electronic device includes an operating system 246 and software programs, applications, or components 248 that are executed by the control circuit 202 and are typically stored in a persistent, updatable store such as the memory 210. Additional applications or programs may be loaded onto the portable electronic device through the wireless network 250, the auxiliary I/O subsystem 224, the data port 226, the short-range communications subsystem 232, or any other suitable subsystem 234. The memory 210 may comprise a non-transitory digital storage media that stores executable code that, when executed by the control circuit 202, causes the control circuit 202 to carry out one or more of the functions or actions described herein.

A received signal such as a text message, an e-mail message, or web page download is processed by the communication subsystem and input to the control circuit 202. The control circuit 202 processes the received signal for output to the display 212 and/or to the auxiliary I/O subsystem 224. A subscriber may generate data items, for example e-mail messages, which may be transmitted over the wireless network 250 through the communication subsystem. For voice communications, the overall operation of the portable electronic device is similar. The speaker 228 outputs audible information converted from electrical signals, and the microphone 230 converts audible information into electrical signals for processing.

The touch-sensitive display 218 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 214. The overlay 214 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 218. The control circuit 202 may determine attributes of the touch, including a location of a touch. Touch location data may include data for an area of contact or data for a single point of contact, such as a point at or near a center of the area of contact.

The location of a detected touch may include x and y components, e.g., horizontal and vertical components, respectively, with respect to one's view of the touch-sensitive display 218. For example, the x location component may be determined by a signal generated from one touch sensor, and the y location component may be determined by a signal generated from another touch sensor. A signal is provided to the controller 216 in response to detection of a touch. A touch may be detected from any suitable input member, such as a finger, thumb, appendage, or other objects, for example, a stylus, pen, or other pointer, depending on the nature of the touch-sensitive display 218. Multiple simultaneous touches may be detected.

Figure 3:
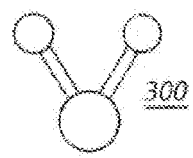
FIG. 3 is a top plan view in accordance with the disclosure.

Referring now to both FIGS. 1 and 3, pursuant to this process 100, the control circuit 202 displays 101 a share-content selection opportunity while also presenting other content. As illustrated in FIG. 3, this share-content selection opportunity may comprise, if desired, a user-selectable icon button 300. (It will be understood that the particular design of the icon shown in FIG. 3 is provided for illustrative purposes and for the sake of example and is not intended to suggest any particular limitations in these regards.)

Figures 1, 4:
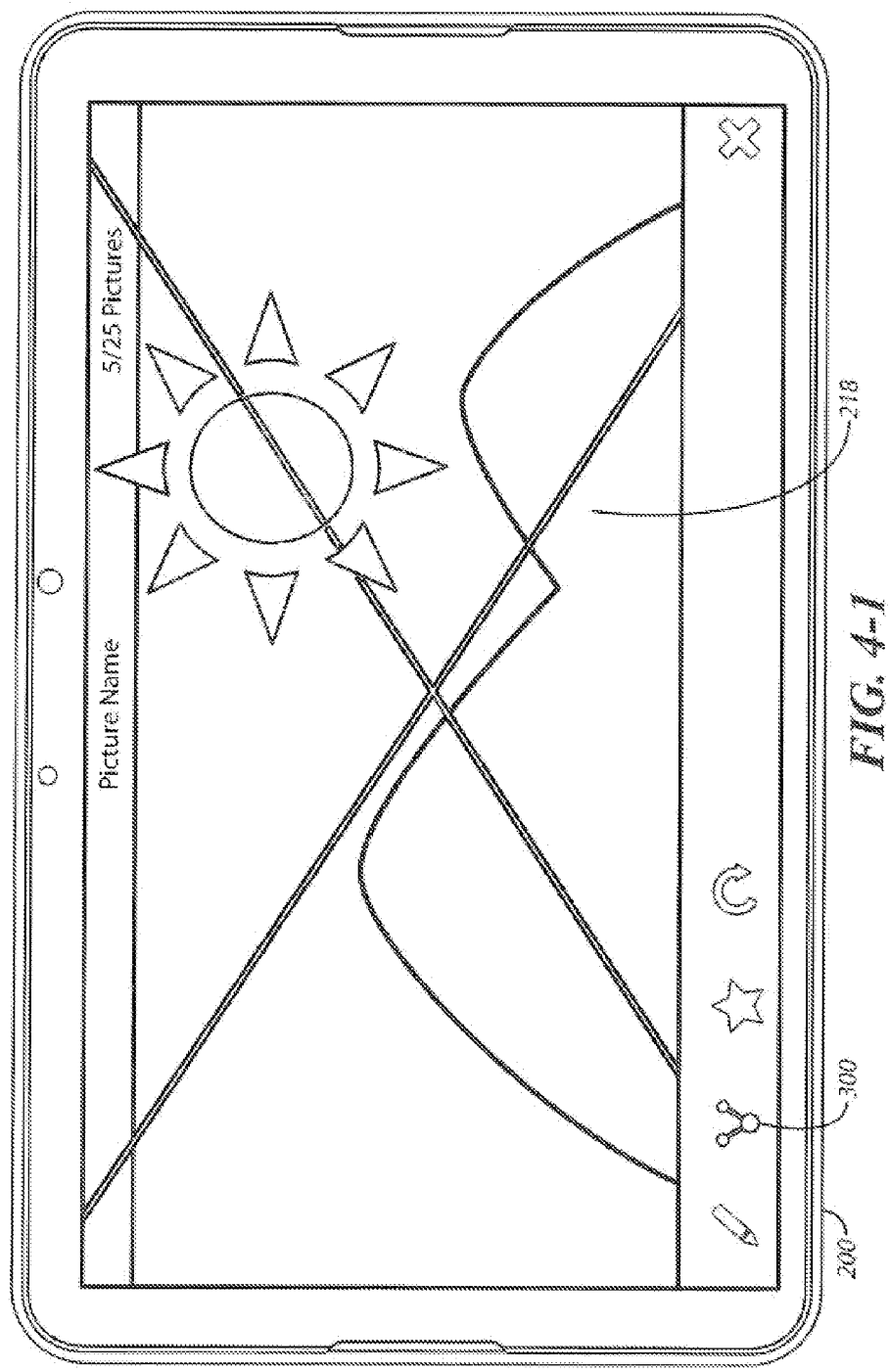
Figures 2, 4:
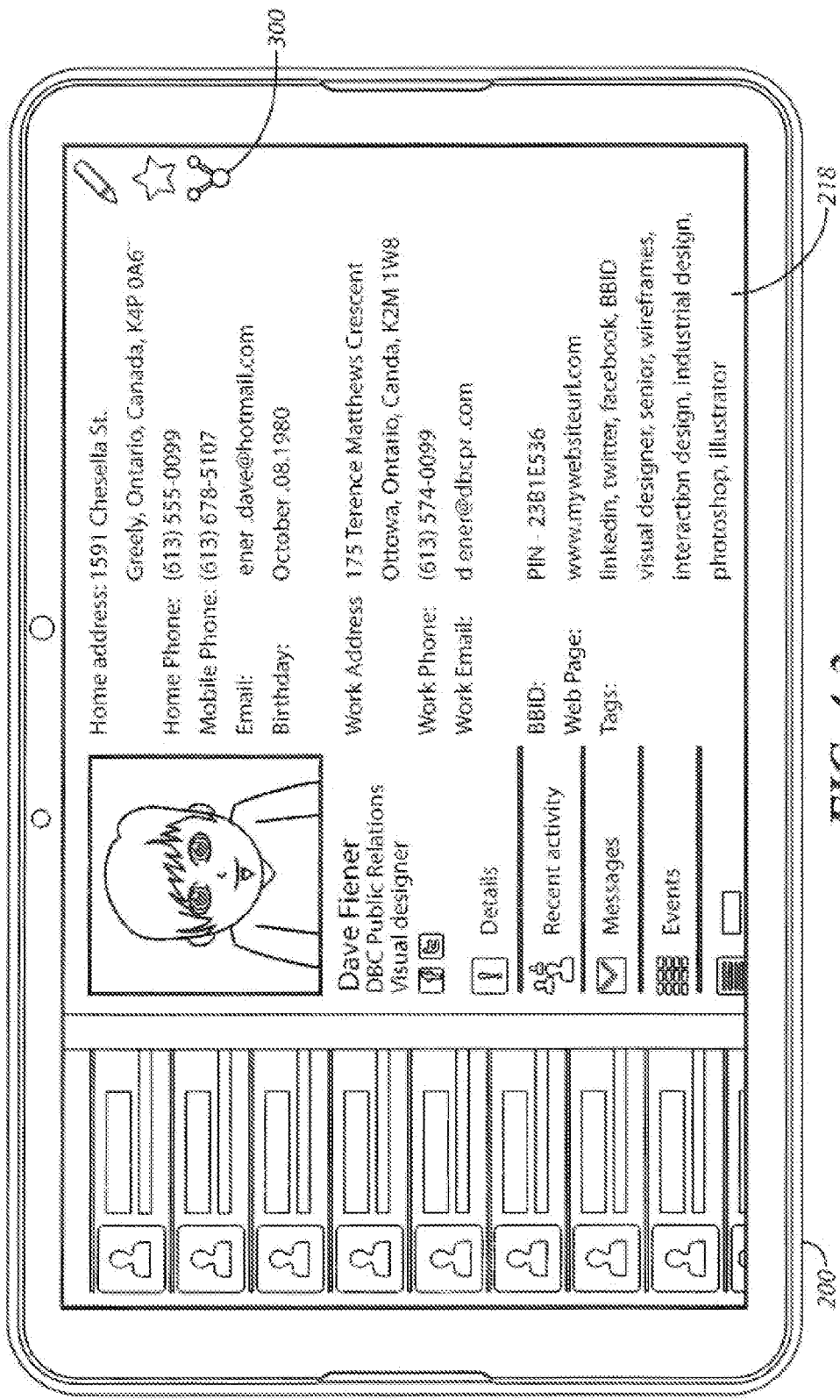
Figures 3, 4:
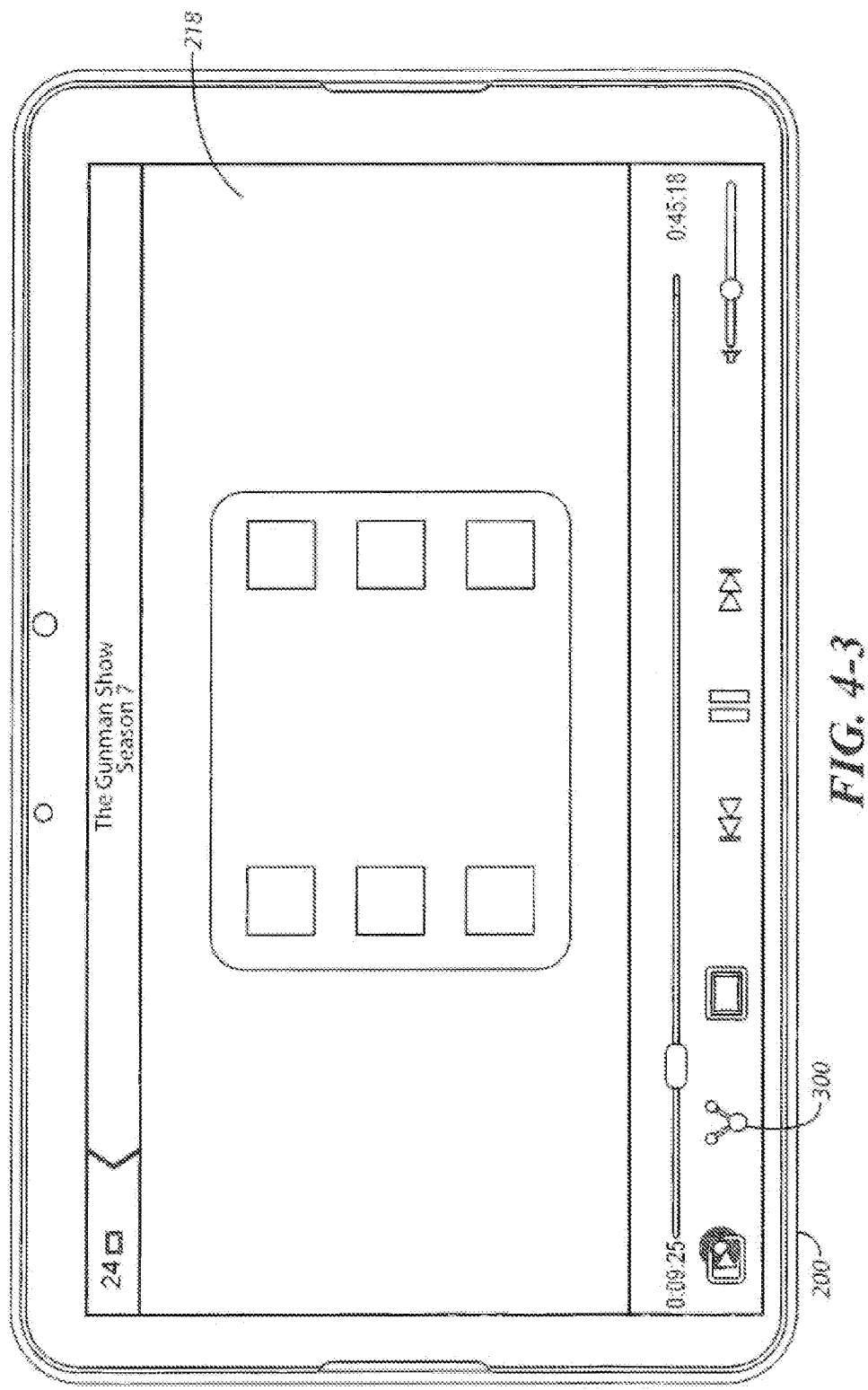
Figure 4:
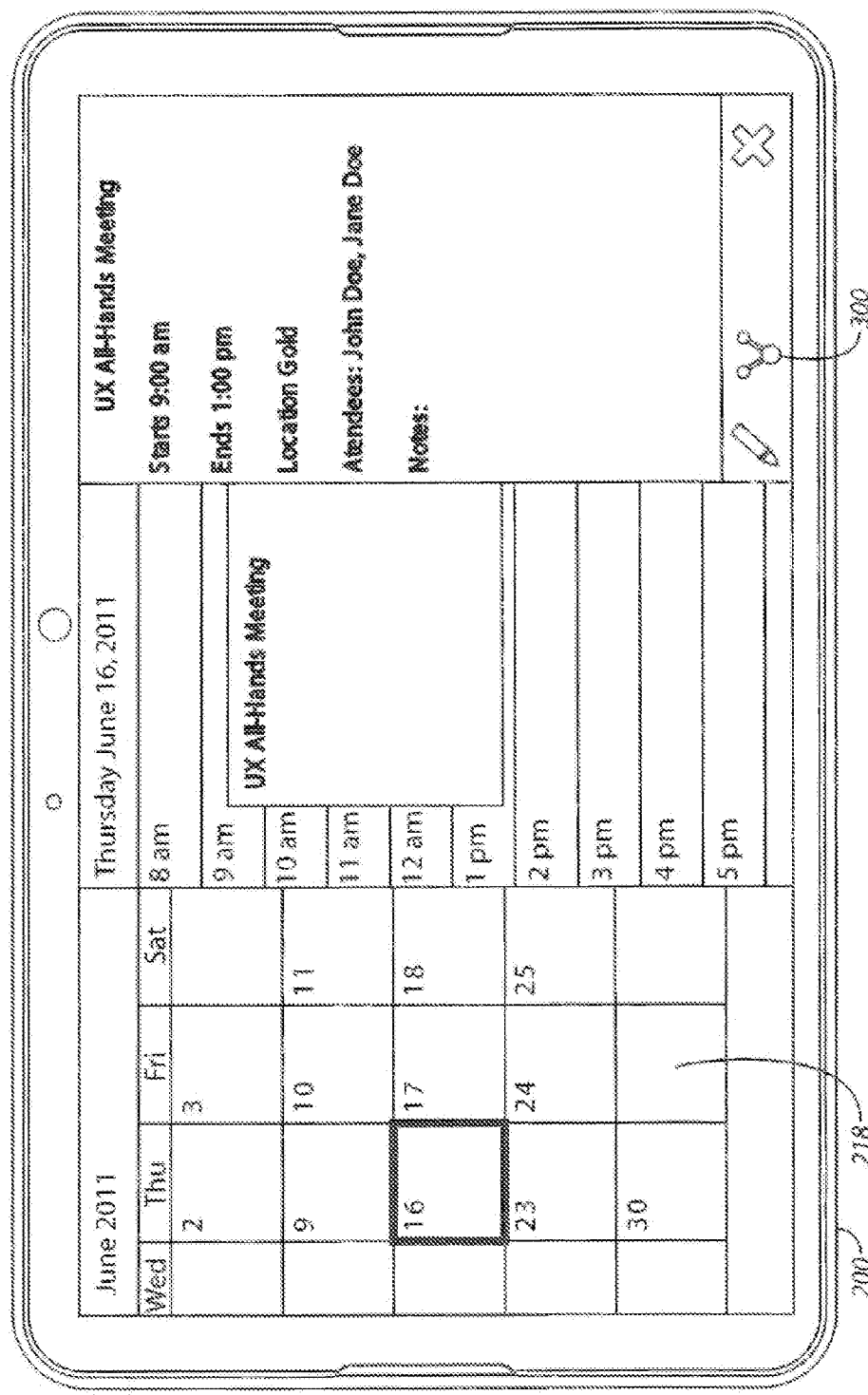

The other content referred to above will typically comprise content that is specific to and otherwise associated with a given application. FIGS. 4-1 through 4-4 provide a number of specific illustrative examples in these regards. In FIG. 4-1, for example, the other content comprises a photograph being provided by an image-processing application. In FIG. 4-2, the other content comprises contact information for a specific contact as provided within the context of a contacts-list application while in FIG. 4-3 the other content comprises a video as provided by a video-playback application. In FIG. 4-4, as yet another example, the other content comprises scheduling information within the presentation context of a corresponding calendar application. These examples, of course, do not constitute an exhaustive presentation in these regards. In fact, the described process 100 will readily accommodate essentially any type of content and application.

In all of the illustrated examples of FIGS. 4-1 through 4-4 the display of the other content accompanies a display of the aforementioned user-selectable icon button 300. The position of this user-selectable icon button 300 can remain constant from one application to another, if desired, or can vary (as shown) to accommodate the needs, limitations, and/or presentation opportunities as tend to characterize a given application.

For the purposes of this description, it will be presumed that a user can select or otherwise assert this user-selectable icon button 300 by tapping the touch-sensitive display 218 in an area of the display 218 that corresponds to the user-selectable icon button 300. When the control circuit 202 detects 102 selection of the user-selectable icon button 300, the control circuit 202 responsively and automatically displays 103 a plurality of different selectable content-sharing services.

Figure 5:
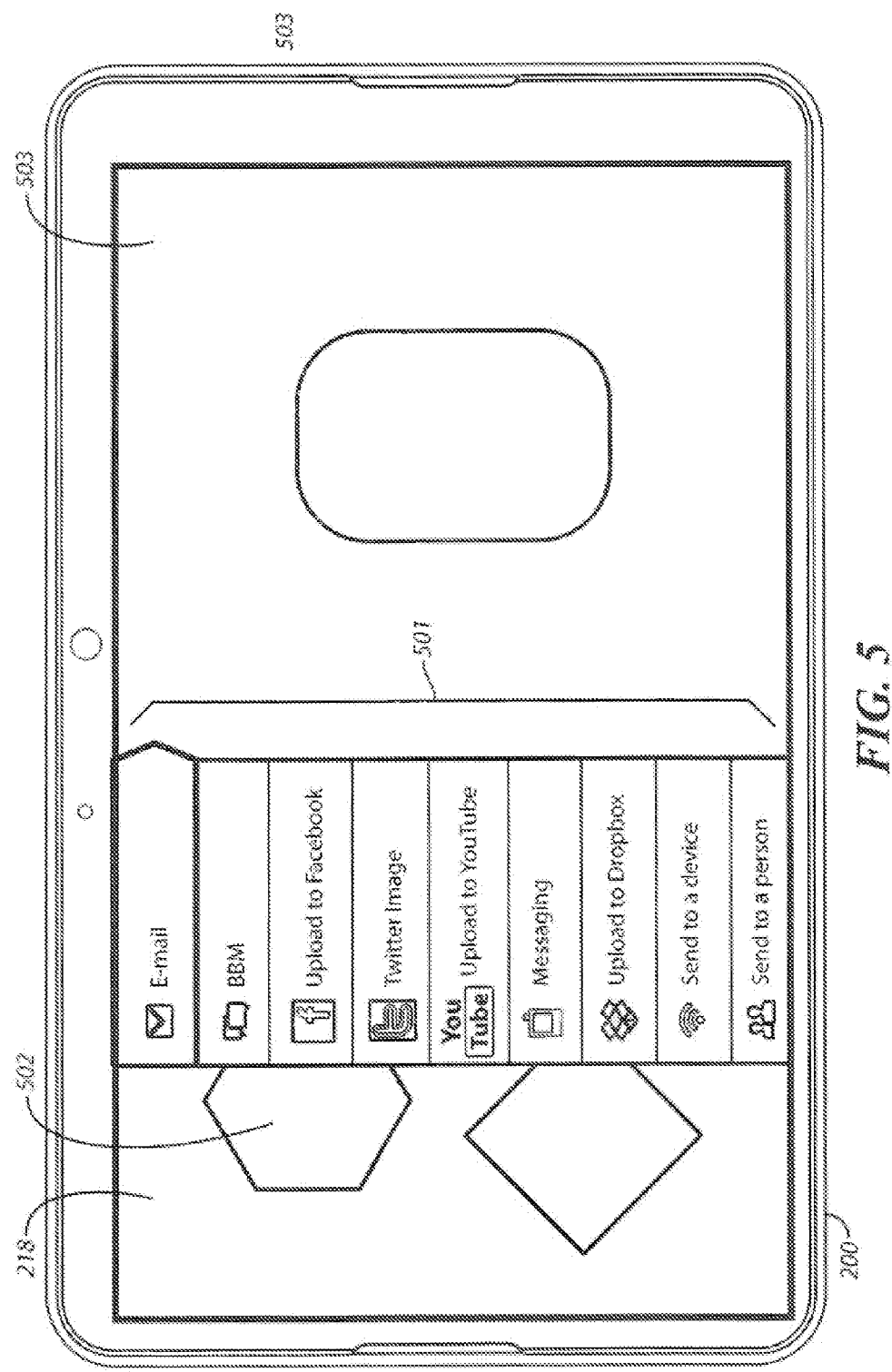
FIG. 5 is a top plan view in accordance with the disclosure.

As shown in FIG. 5, by one approach this displaying 103 can comprise presenting the plurality of different selectable content-sharing services as a listing 501 in a window that partially, but not fully, overlies the aforementioned content (denoted in FIG. 5 by reference numeral 502). Using this approach, the user can remain cognizant of the specific content that is to be shared by making a simple visual reference to that exposed portion of the content 502. When the content 502 comprises, for example, a photographic image, the user can readily see a portion of that photographic image and hence remain properly and easily informed in those regards.

The listing 501 itself can include not only a plurality of different selectable content-sharing services but a plurality of different types of services. For example, this listing 501 can include one or more personal-forwarding services, publishing services, and/or transfer services as desired. This listing 501 can also comprise a scrollable list to permit the user to easily move the list contents to bring into view additional selectable content-sharing services. By one approach, the user can select a given one of these selectable content-sharing services by simply tapping the representation or identification of the desired service.

By one optional approach, the control circuit 202 preselects one of the selectable content-sharing services in the listing 501. In the example shown in FIG. 5 the email-based selectable content-sharing service at the top of the listing 501 is so selected. By one approach the preselected content-sharing service can comprise a most-recently selected one of the different selectable content-sharing services. This most-recently selected content-sharing service can comprise, for example, the most-recently selected content-sharing service for any content-sharing purpose or, if desired, the most-recently selected content-sharing service as was employed when sharing content for the particular application and/or for the particular type of content 502 that is now to be shared.

In addition, the described process 100 can also optionally provide for automatically displaying one or more service windows as correspond to the various ones of the selectable content-sharing services. By one approach, this can comprise automatically displaying 104 only one such service window 503, as shown in FIG. 5. In particular, the displayed service window 503 can comprise a preselected service window as corresponds to the preselected selectable content-sharing service described above. By way of example, the service window 503 displayed in FIG. 5 would comprise a service window for the already-selected email-based selectable content-sharing service.

Figures 1, 6:
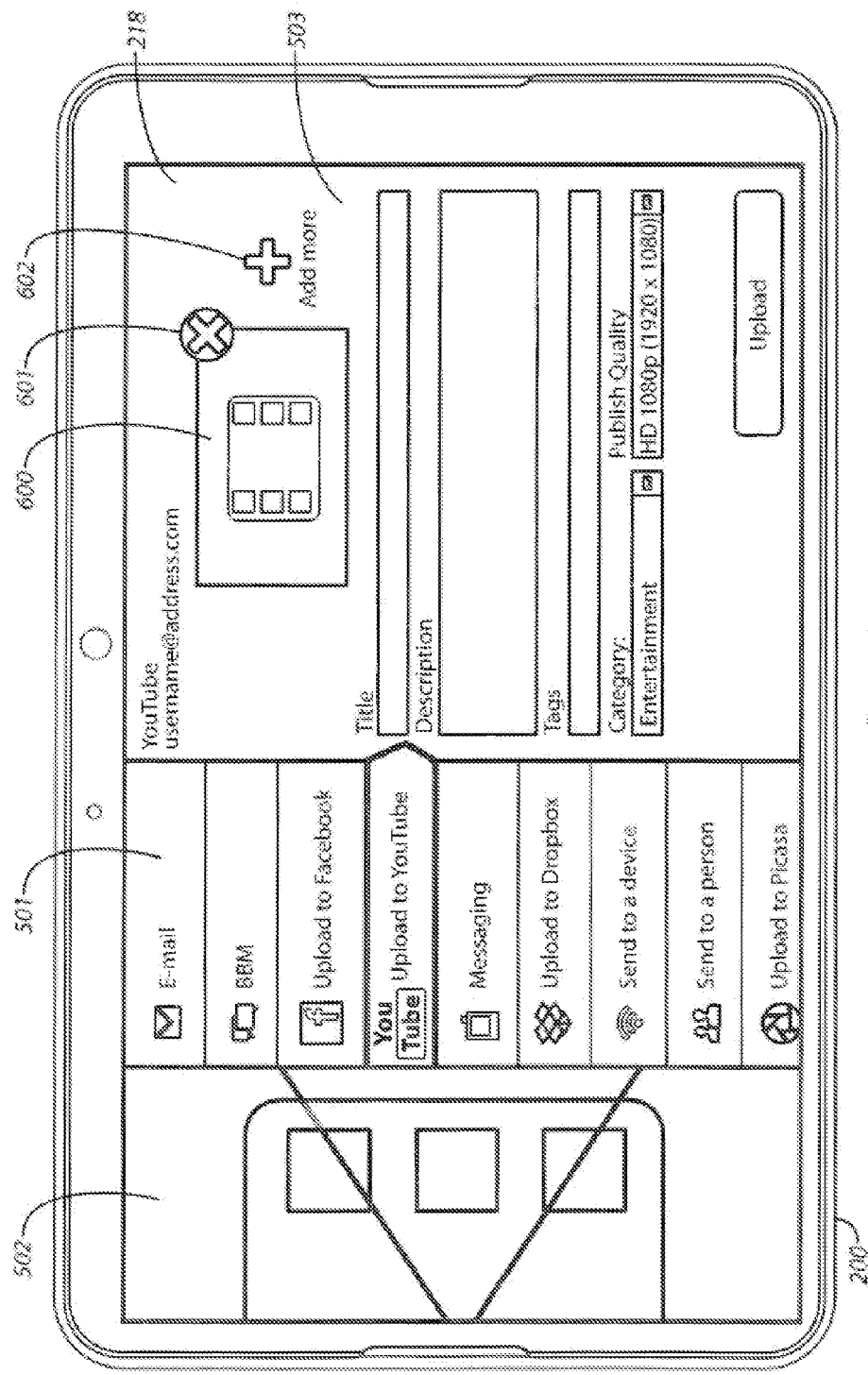
Figures 2, 6:
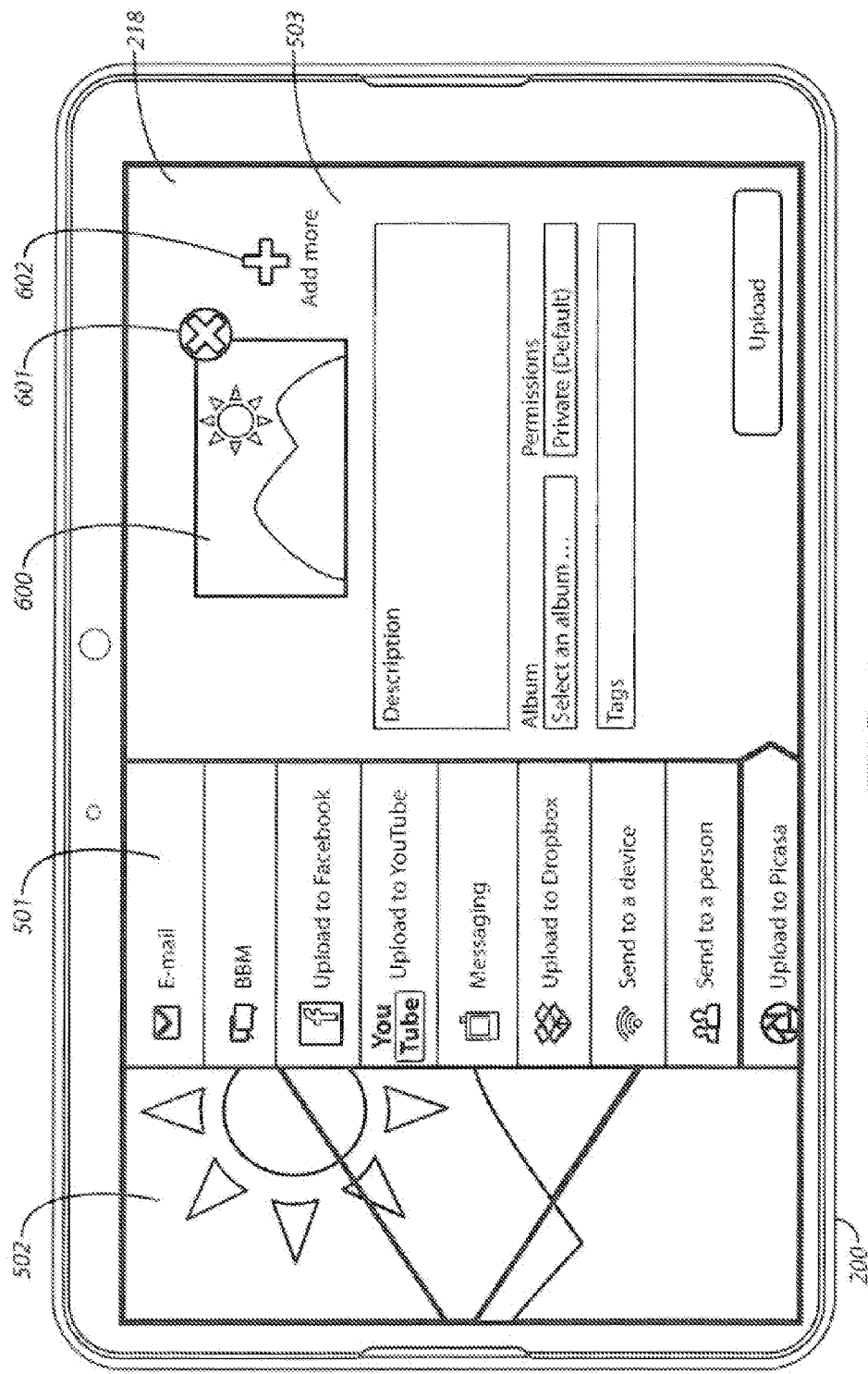

FIG. 6-1 provides one illustrative example in these regards. In this example the content 502 is a video and the pre-selected content-sharing service is the YouTube™ service. The service window 503 is therefore automatically configured to elicit appropriate information from the user for a YouTube™ submission and to send the video (with the corresponding metadata provided by the user) to the YouTube™ service.

FIG. 6-2 provides another illustrative example in these regards. In this example, the content 502 is a photographic image and the pre-selected content-sharing service is the Picassa™ service. The service window 503 is now therefore automatically configured to elicit information that is appropriate when using the Picassa™ service and to send that photographic image (and corresponding metadata) to the Picassa™ service.

By one approach, one or more of these service windows 503 can comprise generic representations that describe and/or otherwise support using the corresponding service in an unbranded manner. These teachings will also support, however, including branding content in a service window 503 as corresponds to a given corresponding content-sharing service. This branding content can include, for example, trademarks and service marks (including words and expressions, catch phrases, logos, and so forth), trade dress (including general designs, font selections, color schemes, and so forth), and so forth.

These teachings are highly flexible in practice and will accommodate a great variety of alteration and embellishment. As one example in these regards, and with continued reference to FIGS. 6-1 and 6-2, the aforementioned service window 503 can include, as appropriate, a thumbnail representation 600 of the content to be forwarded. By one approach, if desired, this thumbnail representation 600 can include a selectable icon 601 that the user can select to delete that particular item of content from the forwarding activity.

Figure 7:
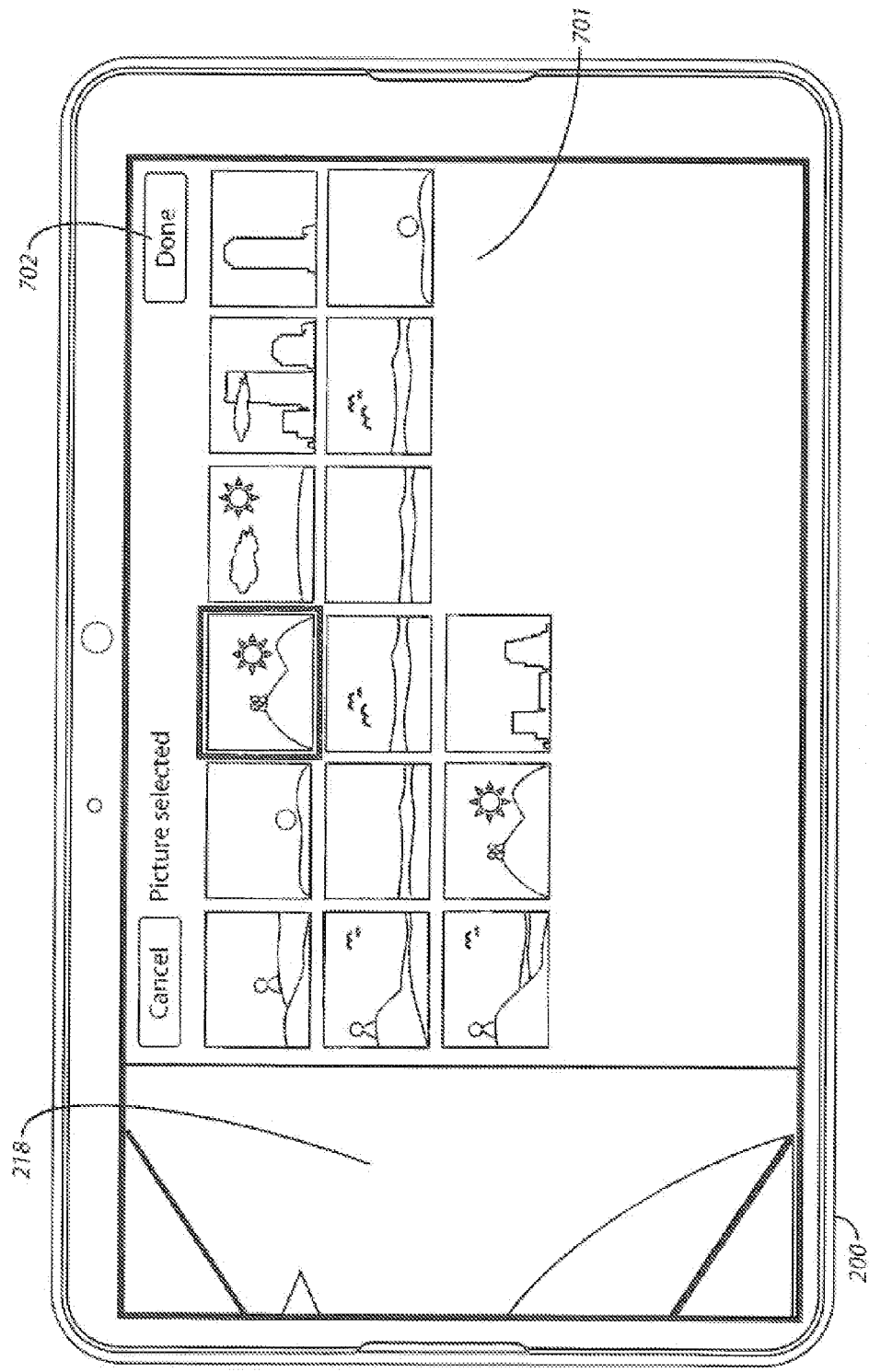
FIG. 7 is a top plan view in accordance with the disclosure.

As yet a further example of the flexibility of these teachings, and again with continued reference to FIGS. 6-1 and 6-2, the service window 503 can also include, if desired, a selectable icon 602 to permit the user to add additional items of discrete content (such as additional photographic images, videos, music files, text files, and so forth) to the present forwarding activity. By way of an illustrative example, if the user selected this icon 602 when viewing the service window 503 shown in FIG. 6-2, a window 701 and/or new screen (as desired), as illustrated in FIG. 7, could be displayed to present other content of similar file type, metadata, or the like that the user could additionally select to include in the forwarding activity. Upon concluding these selections the user could then assert the "done" button 702 to return to the previous service window 503 (which would now include a thumbnail representation for the additionally included items of content).

So configured, a personal electronic device (for example) can greatly facilitate a user's making productive use of a variety of file/content forwarding/sharing services. The concepts set forth herein can greatly ease the user's cognitive loading in these regards and help to ensure useful and even optimized forwarding transactions.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A method comprising:
    displaying content while also co-displaying a share-content selection opportunity;
    detecting selection of the share-content selection opportunity; and
    in response to the detection, displaying a plurality of different selectable content-sharing services by which a user can share the content, wherein the plurality of different selectable content-sharing services comprises at least one service from each of:
    a personal-forwarding service;
    a publishing service; and a transfer service to share the content with another specifically-targeted physical device, wherein upon detecting selection of the share-content selection opportunity, displaying a preselected service window for a given one of the plurality of different selectable content-sharing services by which a user can share the content, wherein the preselected service window is automatically preselected based at least upon being a most-recently selected one of the different selectable content-sharing services for the particular type of content that is now to be shared.

2. The method of claim 1 wherein the share-content selection opportunity comprises a user-selectable icon button.

3. The method of claim 1 wherein displaying the plurality of different selectable content-sharing services comprises displaying the plurality of different selectable content-sharing services in a window that partially, but not fully, overlies the content.

4. The method of claim 1 wherein the preselected service window being automatically preselected additionally displays a second share-content selection opportunity in the pre-selected service window, and further comprising:
   detecting selection of the second share-content selection opportunity; and
   in response to the detection, displaying a second window that presents thumbnail image representations of one or more other content of similar type as the particular type of content that is now to be shared, the thumbnail image representations being individually selectable to include any selected other content in the content-sharing communication along with the content that is now to be shared.

5. The method of claim 1 wherein the preselected service window includes branding content as corresponds to the given one of the plurality of different selectable content-sharing services.

6. An apparatus comprising:
   a display;
   a control circuit operably coupled to the display and configured to:
      display content on the display while also co-displaying on the display a share-content selection opportunity;
      detect selection of the share-content selection opportunity; and
      in response to the detecting, display on the display a plurality of different selectable content-sharing services by which a user can share the content, wherein the plurality of different selectable content-sharing services comprises at least one service from each of:
      a personal-forwarding service;
      a publishing service; and
      a transfer service to share the content with another specifically-targeted physical device, wherein upon detecting selection of the share-content selection opportunity, displaying a preselected service window for a given one of the plurality of different selectable content-sharing services by which a user can share the content, wherein the preselected service window is automatically preselected based at least upon being a most-recently selected one of the different selectable content-sharing services for the particular type of content that is now to be shared.

7. The apparatus of claim 6 wherein the control circuit is configured to display the plurality of different selectable content-sharing services by displaying the plurality of different selectable content-sharing services on the display in a window that partially, but not fully, overlies the content.

8. The apparatus of claim 6 wherein the control circuit is configured to display in the automatically preselected service window a second share-content selection opportunity, and
   in response to detecting selection of the second share-content selection opportunity, displaying a second window that presents thumbnail image representations of one or more other content of similar type as the particular type of content that is now to be shared, the thumbnail image representations being individually selectable to include any selected other content in the content-sharing communication along with the content that is now to be shared.

9. The apparatus of claim 6 wherein the preselected service window includes branding content as corresponds to the given one of the plurality of different selectable content-sharing services.

10. A non-transitory digital memory having stored therein instructions that, when executed by a control circuit, cause the control circuit to:
   display content while also co-displaying a share-content selection opportunity;
   detect selection of the share-content selection opportunity; and
   in response to the detecting, display a plurality of different selectable content-sharing services by which a user can share the content, wherein the plurality of different selectable content-sharing services comprises at least one service from each of:
   a personal-forwarding service;
   a publishing service; and
   a transfer service to share the content with another specifically-targeted physical device, wherein upon detecting selection of the share-content selection opportunity, displaying a preselected service window for a given one of the plurality of different selectable content-sharing services by which a user can share the content, wherein the preselected service window is automatically preselected based at least upon being a most-recently selected one of the different selectable content-sharing services for the particular type of content that is now to be shared.

11. The non-transitory digital memory of claim 10 wherein the preselected service window being automatically preselected additionally causes the control circuit to:
   display a second share-content selection opportunity in the pre-selected service window;
   detect selection of the second share-content selection opportunity; and
   in response to the detection, displaying a second window that presents thumbnail image representations of one or more other content of similar type as the particular type of content that is now to be shared, the thumbnail image representations being individually selectable to include any selected other content in the content-sharing communication along with the content that is now to be shared.

12. The non-transitory digital memory of claim 10 wherein the preselected service window includes branding content as corresponds to the given one of the plurality of different selectable content-sharing services.

* * * * *